US007322040B1

(12) United States Patent
Olson et al.

(10) Patent No.: US 7,322,040 B1
(45) Date of Patent: Jan. 22, 2008

(54) AUTHENTICATION ARCHITECTURE

(75) Inventors: Lance E. Olson, Sammamish, WA (US); Henrik Frystyk Nielsen, Seattle, WA (US); Cem Paya, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 830 days.

(21) Appl. No.: 09/818,358

(22) Filed: Mar. 27, 2001

(51) Int. Cl.
*G06F 17/30* (2006.01)
*H04L 9/32* (2006.01)
(52) U.S. Cl. .............................................. 726/8; 726/2
(58) Field of Classification Search .................... 713/1; 726/2
See application file for complete search history.

(56) References Cited

U.S. PATENT DOCUMENTS

| | | | | |
|---|---|---|---|---|
| 5,774,551 A | * | 6/1998 | Wu et al. .................... | 713/155 |
| 5,822,539 A | * | 10/1998 | van Hoff .................... | 709/236 |
| 5,878,411 A | * | 3/1999 | Burroughs et al. ............ | 707/4 |
| 6,058,423 A | | 5/2000 | Factor | |
| 6,067,623 A | | 5/2000 | Blakley, III et al. | |
| 6,192,382 B1 | * | 2/2001 | Lafer et al. ................. | 715/513 |
| 6,219,790 B1 | * | 4/2001 | Lloyd et al. ................. | 726/14 |
| 6,269,367 B1 | * | 7/2001 | Travis et al. ................. | 707/6 |
| 6,279,111 B1 | | 8/2001 | Jensenworth et al. | |
| 6,343,287 B1 | * | 1/2002 | Kumar et al. ................. | 707/4 |
| 2002/0133570 A1 | * | 9/2002 | Michel ........................ | 709/219 |

OTHER PUBLICATIONS

Kessler: Gary Kessler, "Security in Windows NT", 1997,☐☐http://www.garykessler.net/library/ntsecurity.html.*
Kaeo: Merike Kaeo, "Designing Network Security", 1999, ISBN: 1578700434.*
Itoi et al. (Pluggable Authentication Modules for Windows NT).*
Brett Hill, "IIS 101: The Basics of IIS Authentication", <http://www.windowsitpro.com/Web/Article/ArticleID/15843/15843.html>).*
Microsoft (Microsoft, "Windows 2000 Server TCP/IP core networking guide", 2000, ISBN: 1572318058).*
Hadfield et al. (Lee Hadfield, Dave Hater, Dave Bixler, "Windows NT Server 4 Security Handbook", 1997, ISBN: 078971213), p. 76, 79, 81, 93, 169, 344.*
Microsoft Press, Computer Dictionary, 3rd edition, ISBN: 157231446X, 1997) p. 166.*
New Rider (New Rider, "Windows 98 Professional Reference", http://cma.zdnet.com/book/win98prfref/ch15/ch15.htm).*
Hamilton (Caching, http://www.net.lut.ac.uk/eval/node6.html).*
Oppliger, et al., "A Security Architecture for Tenet Scheme 2," 1996.

* cited by examiner

*Primary Examiner*—Kambiz Zand
*Assistant Examiner*—Peter Poltorak
(74) *Attorney, Agent, or Firm*—Amin, Turocy & Calvin, LLP

(57) ABSTRACT

A system enabling an application desiring access to a resource addressable by a URI to produce a response to an authentication challenge to a request to access the URI without including code specific to an authentication system and/or method is provided. The system includes an authentication manager that can pass an authentication challenge to authentication modules and/or objects operable to produce a response to the authentication challenge. The system may also include a cache adapted to store one or more responses to the authentication challenge communicated from the authentication modules, with such cache also being employed to facilitate pre-authenticating test challenges and/or pseudo-challenges.

25 Claims, 13 Drawing Sheets

AUTHENTICATION MANAGER CLASS

AUTHENTICATION MODULE CLASS

US 7,322,040 B1

AUTHENTICATION ARCHITECTURE

TECHNICAL FIELD

The present invention relates generally to computer programming and more particularly to simplifying writing programs that generate requests to access resources locatable by a Universal Resource Identifier (URI), where the requested access may require authentication.

BACKGROUND OF THE INVENTION

As applications and services have become more commonly available over computer networks, the numbers of users accessing such applications has increased. Such applications and services (hereinafter "resources") can benefit from having the identity of the user requesting access to the resources authenticated. Conventionally, a program written to access a resource provided over a network, where access to the resource requires authentication, had to include code specific to the authentication system(s) and/or method(s) (hereinafter "authentication system") employed to authenticate the desired access. For example, a program written to access a resource residing on a server that employs a Kerberos-based authentication system would be required to include code specific to the Kerberos-based authentication system.

Including such authentication system specific code in a program can negatively impact writing such a program by requiring the programmer(s) involved in writing the program to learn the specifics of the authentication system employed by the resource to which access is desired. Learning such authentication system specific details and accounting for such details in application program code requires time, adds complexity and thus generates additional expense in creating such programs. Furthermore, the program that includes the authentication system specific code will be restricted to accessing resources employing the authentication specific system. Thus, if the authentication system changes, the program including such authentication system specific code could require rewriting and recompiling, adding further complexity, time and expense. In addition, if the program desired to access resources employing different authentication systems, then the program would again have to be rewritten and recompiled, adding yet further complexity, time and expense. One conventional approach to solving the problem of dealing with various authentication systems is to write a resource accessing program that includes authentication system specific code for multiple authentication systems. But this solution produces large, complex programs, susceptible to the introduction of bugs, and which still cannot respond to new authentication systems.

New computer security methods, including new resource request authentication systems, are frequently created. Programs protecting resources can benefit from employing such new authentication systems. For example, security provided by an authentication system may have been compromised by a computer hacker requiring a new authentication system to be developed to defeat the avenue of attack employed by the hacker. Thus, a program protecting a resource by employing the old authentication system could be vulnerable to the hacker attack, while a program employing the new authentication system may not be similarly vulnerable. But creating a new authentication system and/or method creates additional problems, including the program rewriting and recompilation problems addressed above.

Thus a system and/or method to simplify writing applications that generate requests that may require authentication is still needed to mitigate problems associated with conventional systems.

SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description that is presented later.

The present invention provides and a system and method that simplifies writing a program that will generate requests that may require authentication by one or more authentication systems. Whereas conventional systems require writing code specific to the authentication system employed to protect the resource that the program seeks to access, the present invention provides an architecture, objects and interface that facilitate treating various authentication systems in a generic manner, so that an accessing program can be substantially isolated from the authentication system details. By way of illustration, the present invention facilitates a programmer writing code that requests access to a resource, where the code does not have to be rewritten or recompiled to interact with different authentication systems. For example, the same code could interact with authentication systems including, but not limited to, Kerberos, Digest, Basic and NTLM (Windows NT LAN Manager) authentication systems, without having to handle authentication system specific details.

The present invention also provides a system and method that simplifies producing a new authentication system and making it available to applications without requiring rewriting and recompilation of applications that generate requests to access a resource protected by the new authentication system by providing an interface to an architecture of objects. Conventionally, an authentication system author had no generic interface or attachment points to which the author could code. The present invention provides an interface to which the author can code, and a method for registering a new authentication module operable to interact with the new authentication system. Thus, an application program can benefit from the new authentication system without being rewritten or recompiled.

One aspect of the present invention provides a system that enables an application to produce a response to an authentication challenge. A server can generate an authentication challenge in response to a request seeking access to a URI, when accessing that URI requires that the generator of such requests be authenticated. For example, a HyperText Transfer Protocol (HTTP) get request can cause a server to generate an authentication challenge. The system includes an authentication manager that is adapted to communicate data associated with such an authentication challenge to an authentication module and/or object. The authentication manager can supervise one or more authentication modules and/or objects that have been registered with the authentication manager. The system also includes one or more authentication modules and/or objects that can receive data associated with the authentication challenge from the authentication manager and produce a response to the authentication challenge. For example, a first authentication module may be capable of handling challenges issued by a Kerberos system while a second authentication module may be capable of handling challenges issued by a Digest system. The authentication manager can distribute data associated with an authentication challenge to authentication modules and/or objects until either a successful response is generated, or the available authentication modules are exhausted, in which case the challenge could not be survived. The system also includes a cache adapted to store responses to the authentication challenge. The cache can be employed in pre-authentication methods.

Another aspect of the present invention provides a method for enabling an application to produce a response to an authentication challenge. The method includes creating one or more authentication modules that can be called by the authentication manager. Each authentication module is operable to produce a response to one or more authentication challenges. The authentication modules are registered with the authentication manager. Such registration includes informing the authentication manager of which authentication system challenges the authentication module is capable of processing. For example, an authentication module may inform the authentication manager during registration that the authentication module can process challenges from Basic and NTLM authentication systems. The registration may also include updating a data store that can hold information concerning available authentication modules. The authentication manager can accept data associated with an authentication challenge from a process communicating with the issuer of the authentication challenge and pass data associated with the authentication challenge to an instance of an authentication module. If the authentication module is capable of producing a response to the authentication challenge, then it will do so. But if the authentication module cannot produce a response to the authentication challenge, then the authentication module will so indicate to the authentication manager, which may then communicate data associated with the authentication challenge to a different authentication module.

To the accomplishment of the foregoing and related ends, certain illustrative aspects of the invention are described herein in connection with the following description and the annexed drawings. These aspects are indicative of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION

Figure 1:
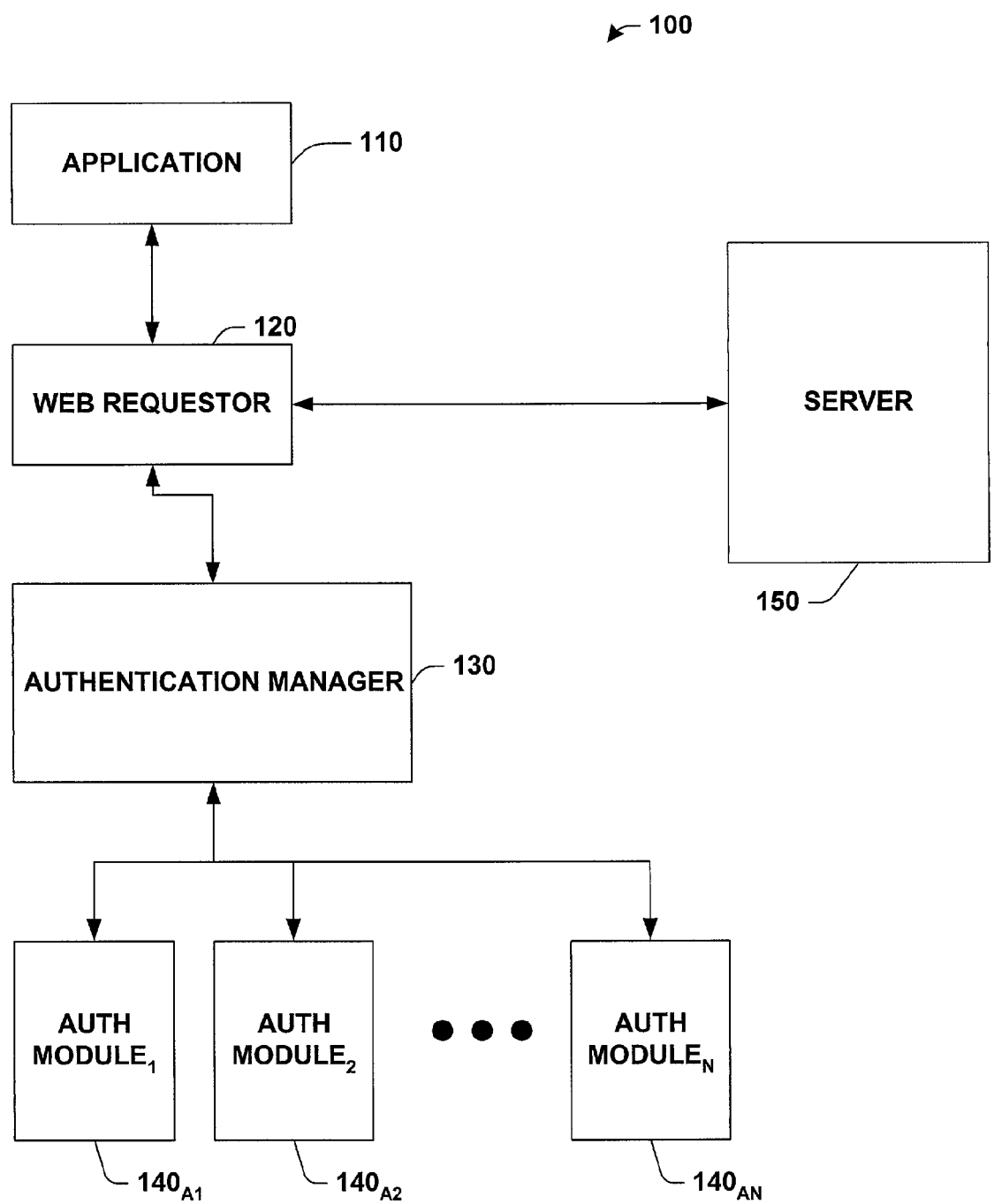
FIG. 1 is a block diagram illustrating an application employing an authentication manager and an authentication module to facilitate access to a server that requires authentication of requests, in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident to one skilled in the art that the present invention may be practiced without these specific details. In other instances, well-known structures and devices are shown in block diagram form in order to facilitate description of the present invention.

The term "component" refers to a computer-related entity, either hardware, a combination of hardware and software, software, or software in execution. For example, a component may be a process running on a processor, a processor, an object, an executable, a thread of execution, a program and a computer. By way of illustration, both an application running on a server and the server can be components. A component may reside in one physical location (e.g., in one computer) and/or may be distributed between two or more cooperating locations (e.g., parallel processing computer, computer network).

The term "module" refers to a computer-related entity, either hardware, a combination of hardware and software, software, or software in execution. For example, a module may be a process running on a processor, a processor, an object, an executable, a thread of execution, a program and a computer. By way of illustration, both an application running on a server and the server can be modules. A module may reside in one physical location (e.g., in one computer)

and/or may be distributed between two or more cooperating locations (e.g., parallel processing computer, computer network).

The term "class factory" refers to a computer-related entity, either hardware, a combination of hardware and software, software, or software in execution. For example, a class factory may be a process running on a processor, a processor, an object, an executable, a thread of execution, a program and a computer. By way of illustration, both an application running on a server and the server can be class factories. A class factory may reside in one physical location (e.g., in one computer) and/or may be distributed between two or more cooperating locations (e.g., parallel processing computer, computer network).

It is to be appreciated that various aspects of the present invention may employ technologies associated with facilitating unconstrained optimization and/or minimization of error costs. Thus, non-linear training systems/methodologies (e.g., back propagation, Bayesian, fuzzy sets, non-linear regression, or other neural networking paradigms including mixture of experts, cerebella model arithmetic computer (CMACS), radial basis functions, directed search networks and function link networks) may be employed.

Referring initially to FIG. 1, a system 100 for enabling an application 110 to produce a response to an authentication challenge without requiring the application 110 to include code specific to an authentication system is illustrated. The application 110 may be, but is not limited to being, a computer program written in a compiled language, (e.g., C++), the program executing on one or more computers; a computer program written in a compiled language, (e.g., C++) where the program is burnt into one or more PROMS (Programmable Read-only Memories); and specially manufactured special purpose hardware. The application 110 may generate a request to access a resource addressable via a URI served by the server 150. The server 150 may resolve the URI in the request and determine that access to the URI requires authentication of the request generator. The application 110 may format the request and send it to the server 150, or the application 110 may employ a web requestor 120 operable to handle protocol specific details associated with communicating with a server 150.

Upon receiving the request to access a resource where the requested access requires authentication, the server 150 could produce an authentication challenge that could be returned to the application 110. If the application 110 had employed the web requestor 120 to send the request, then the authentication challenge may be received by the web requestor 120. The web requestor 120 may comprise entities including, but not limited to, one or more cooperating objects, a computer program, computer hardware, a process, one or more cooperating threads, and special purpose computer hardware. The web requestor 120 could then pass a first data associated the authentication challenge to an authentication manager 130. The first data passed to the authentication manager 130 could comprise all, substantially all, a portion, or none of the authentication challenge received from the server 150. The authentication manager 130 may comprise entities including, but not limited to, one or more cooperating objects, a computer program, computer hardware, a process, one or more cooperating threads, and special purpose computer hardware. The authentication manager 130 can receive the first data and process the first data into a second data. The second data could comprise all, substantially all, a portion, or none of the authentication challenge received from the server 150 and/or all, substantially all, a portion, or none of the first data. The authentication manager 130 can then communicate the second data to one or more authentication modules. For example, a first authentication module $140_{A1}$, and a second authentication module $140_{A2}$ through an Nth authentication module $140_{AN}$, N being an integer, (collectively referred to as the authentication modules 140A) could be available to the authentication manager 130. The authentication modules 140A may include, but not limited to, one or more cooperating objects, a computer program, computer hardware, a process, one or more cooperating threads, and special purpose computer hardware. In one exemplary aspect of the present invention, the authentication modules 140A are instances of authentication objects.

Each of the authentication modules 140A may be capable of producing a response to an authentication challenge generated by one or more different authentication systems. For example, the authentication module $140_{A1}$ may be capable of producing a response to a challenge generated by a Kerberos system, while the authentication module $140_{A2}$ may be capable of producing a response to challenges generated by a Digest system and a Basic system. In one exemplary aspect of the present invention, the authentication modules 140A are operable to respond to a query seeking to ascertain to which, if any, authentication systems, an authentication module is able to produce a response. In an alternative exemplary aspect of the present invention, if one of the authentication modules 140A receives data associated with an authentication challenge to which it can produce a response, the authentication module will produce such a response and pass the response to the authentication manager 130, which will in turn pass the response to the web requester 120 which will in turn pass the response to the server 150. The authentication modules 140A may all reside on one computer, or the authentication modules 140A may be distributed between two or more computers. Similarly, the authentication manager 130, the web requestor 120, and the application 110 may reside on one computer or may be distributed between two or more computers.

The application 110 and/or the web requestor 120 can communicate with the server 150 via one or more networks and/or one or more protocols. By way of illustration, the application 110 may reside on a client computer that accesses the server 150 via a local area network. By way of further illustration, the application 110 may be a client program that employs a web requestor 120 object to access the server 150 via the World Wide Web portion of the Internet. Although two illustrations of an application 110 accessing the server 150 are provided, it is to be appreciated by one skilled in the art that other methods for accessing a resource addressable by a URI can be employed in accordance with the present invention.

In one exemplary aspect of the present invention, the authentication manager 130 and the authentication modules 140 are callable by the application 110 and/or the web requestor 120 without the authentication manager 130 or the authentication modules 140 being incorporated into the application 110. Thus, the application 110 can benefit from authentication challenge response functionality provided by the authentication modules 140A without including code specific to an authentication system. Further, the application 110 can benefit from new authentication modules 140A registered with the authentication manager 130 without requiring rewriting or recompilation. Thus, lifespan and complexity problems associated with conventional systems are mitigated.

Figure 2:
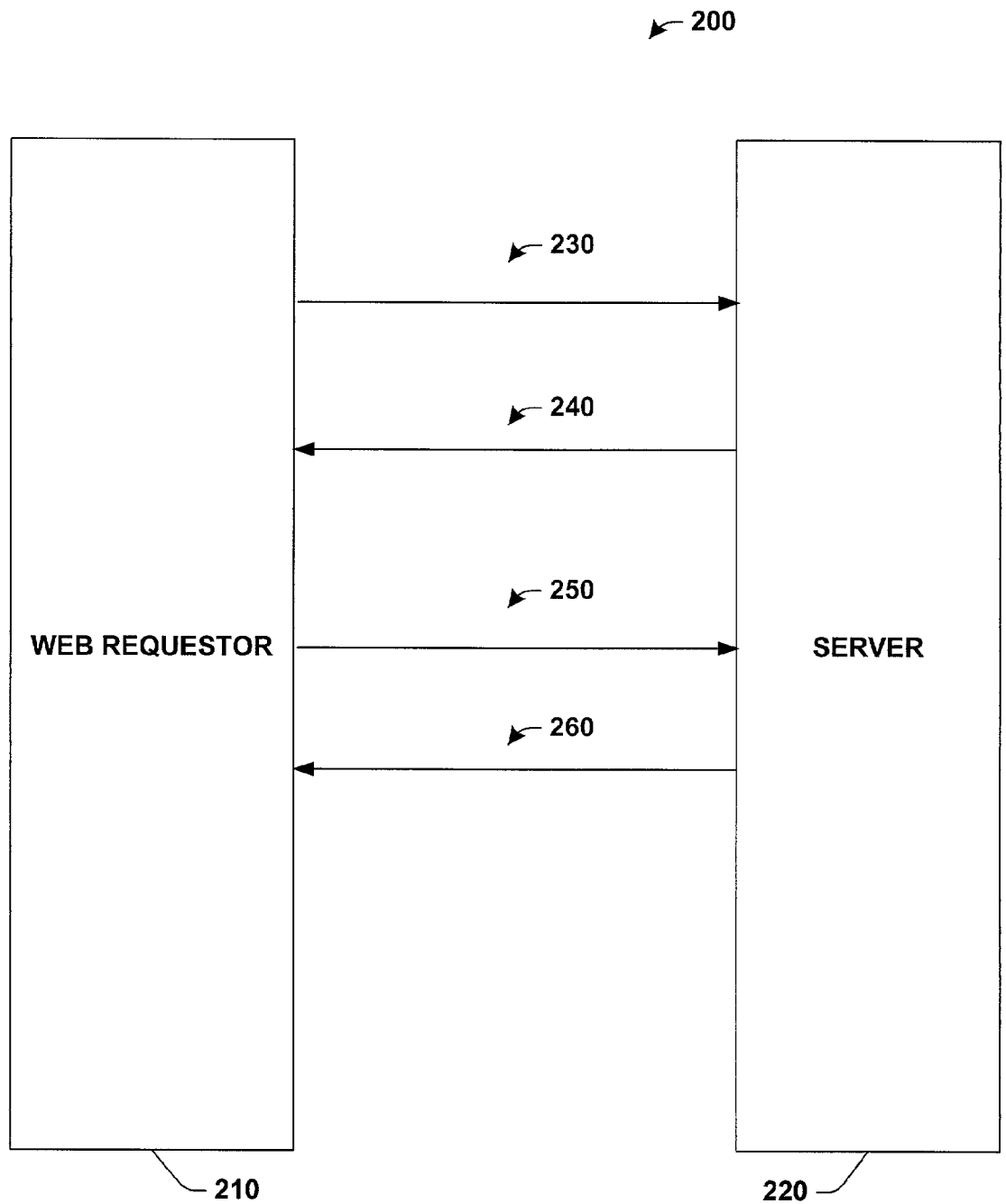
FIG. 2 illustrates a sample request, authentication challenge, response and resource flow, in accordance with an aspect of the present invention.

Referring now to FIG. 2, a sample message flow 200 between a web requester 210 and a server 220 is illustrated.

The web requestor 210 can be implemented as entities including, but not limited to, computer programs, processes, threads, objects, and computer hardware. It is to be appreciated by one skilled in the art that the web requestor 210 may be a single component or a collection of distributed components. The web requestor 210 can forward a request 230 to access a resource to the server 220. The request 230 may include a URI, the URI being employable to resolve an address where the desired resource can be located. The resource addressable by the URI in the request 230 may cause an authentication system employed by the server 220 to resolve the URI and to determine that access to the resolved URI requires authentication. Thus, the authentication system employed by the server 220 can generate an authentication challenge 240 that is transmitted to the web requestor 210. Although one request 230 and one authentication challenge 240 are illustrated, it is to be appreciated by one skilled in the art that some authentication systems may involve more than one request 230 authentication challenge 240 pair. It is to be further appreciated that one request 230 can generate one or more authentication challenges 240. Thus, more than two exchanges (e.g., 250, 260) may take place between the web requester 210 and the server 220.

After processing by an authentication manager (e.g., 130, FIG. 1) and one or more authentication modules (e.g., 140A, FIG. 1), the web requester 210 can transmit a response 250, the response 250 being responsive to the authentication challenge 240. Although one response 250 is illustrated, it is to be appreciated by one skilled in the art that more than one response 250 may be generated in response to the authentication challenge 240. It is to be further appreciated that some authentication systems may generate more than one authentication challenge 240, which can result in more than one response 250 being generated. If the response 250 satisfies the authentication system that generated the authentication challenge 240, then the server 220 may return a resource 260. Although one resource 260 is illustrated, it is to be appreciated by one skilled in the art that a greater number of resources 260 may be transmitted. If the response 250 does not satisfy the authentication system employed by the server 220, then the authentication system employed by the server 220 may generate one or more additional authentication challenges 240 and/or the authentication system employed by the server 220 may deny the request 230.

Although the message flow illustrated in FIG. 2 illustrates error-free, synchronized requests, authentication challenges, responses and resource delivery, it is to be appreciated by one skilled in the art that well-known techniques including, but not limited to, timeout mechanisms, retransmission mechanisms, synchronous delivery and asynchronous delivery may be employed in accordance with the present invention.

Figure 3:
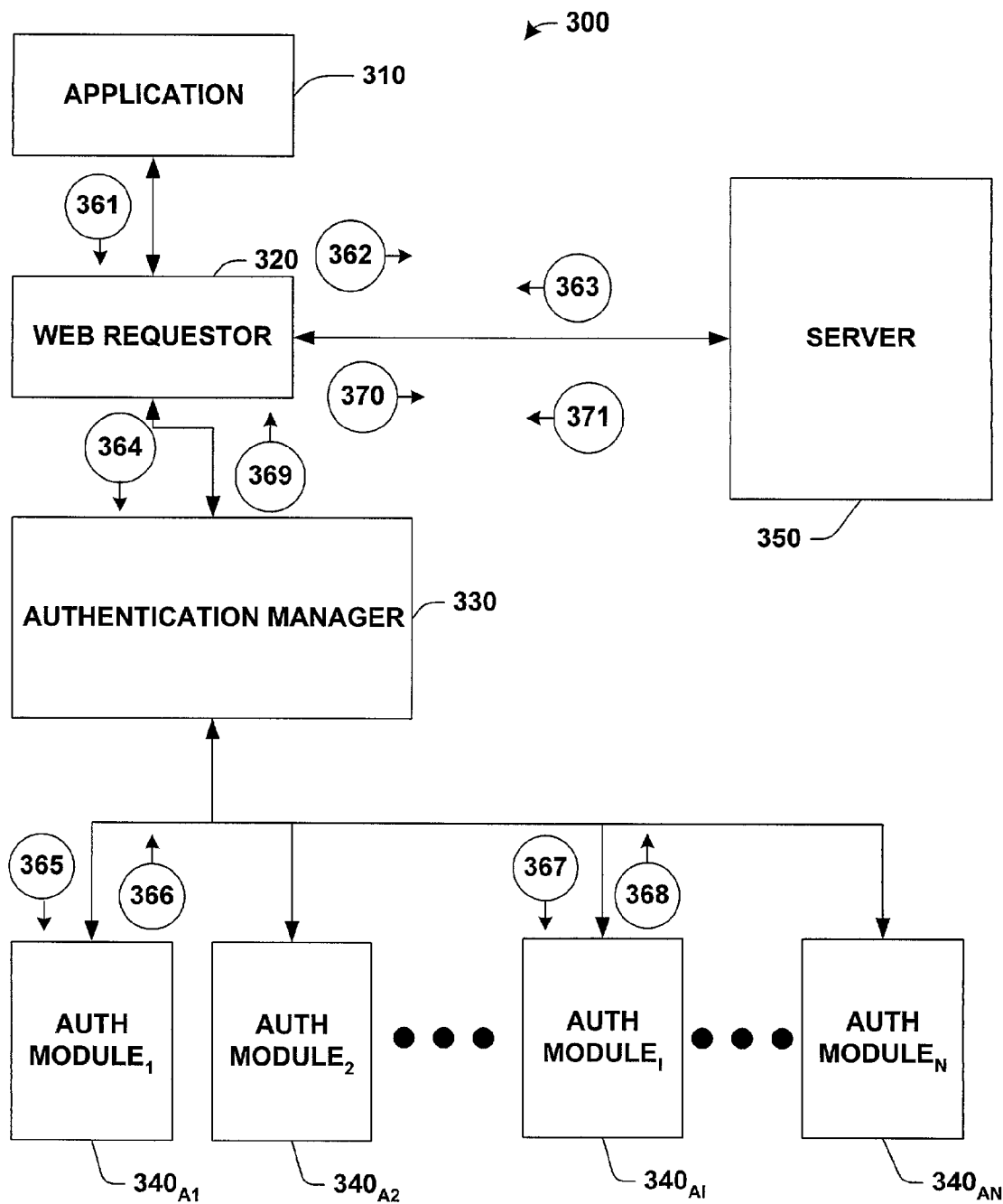
FIG. 3 is a schematic block diagram illustrating an exemplary data flow through an application employing an authentication manager and an authentication module to facilitate access to a resource supported by a server, where the resource requires authentication of a request, in accordance with an aspect of the present invention.

Referring now to FIG. 3, a system 300 for enabling an application 310 to produce a response to an authentication challenge without incorporating code specific to the authentication system employed to generate the authentication challenge is illustrated. In addition, a sample data flow through the system 300 is illustrated. The application 310 may generate an application request 361 to access a resource addressable via a URI. The application request 361 can be delivered to a web requestor 320 that can handle details specific to communicating over a network with the server 350. Alternatively, the application request 361 may be formatted by the application 310 and delivered by the application 310 to the server 350 as a request 362. The web requestor 320 can process the application request 361 to produce the request 362 that is delivered to the server 350 that serves the resource addressed by the URI. The request 362 may require the server 350 to resolve the URI in the request 362, and to determine that access to the URI requires authentication of the request generator.

Upon receiving the request 362 to access a resource, where the requested access requires authentication, the server 350 could produce an authentication challenge 363 that is returned to the web requestor 320. The web requestor 320 could then pass a first data 364 associated the authentication challenge 363 to an authentication manager 330. The first data 364 passed to the authentication manager 330 could comprise all, substantially all, a portion, or none of the authentication challenge 363 received from the server. For example, protocol specific headers, footers and/or formatting characters may be removed from the authentication challenge 363 before it is passed to the authentication manager 330, to facilitate producing a generic authentication manager 330. In an exemplary aspect of the present invention, the first data 364 includes the authentication challenge 363 minus data communication specific information (e.g., HTTP headers). The authentication manager 330 receives the first data 364 and processes the first data 364 into a second data 365. The second data 364 could comprise all, substantially all, a portion, or none of the authentication challenge 363 received from the server 350 and/or all, substantially all, a portion, or none of the first data 364. For example, protocol specific headers, footers and/or formatting characters may be removed from the first data 364 before it is passed to the authentication module $340_{A1}$, to facilitate producing a generic authentication module $340_{A1}$.

The authentication manager 330 can communicate the second data 365 to one or more authentication modules (e.g., $340_{A1}$ through $340_{AN}$, N being an integer). The second data 365 may be communicated to one or more authentication modules until either a response is generated or the available authentication modules are exhausted with no response being generated. By way of illustration, a first authentication module $340_{A1}$ may receive the second data 365 and produce an error code 366 indicating that the authentication module $340_{A1}$ was unable to produce a response to the authentication challenge 363. Further authentication modules (e.g., $340_{A2}$) may similarly be unable to produce a response to the authentication challenge 363. But an Ith authentication module $340_{AI}$, I being an integer less than N, may also be passed a second data 367. The second data 367 may be identical, substantially identical, partially the same or completely different from the second data 365, as the authentication manager 330 may process the first data 364 differently depending, at least in part, on the authentication module to which the first data 364 will be sent for processing.

If the authentication module $340_{AI}$ receives the second data 367 and determines that it can produce a response, then authentication module $340_{AI}$ will produce a third data 368 and pass the third data 368 to the authentication manager 330. The authentication manager 330 can process the third data 368 and produce a fourth data 369 to the web requester 320, which will in turn process the fourth data 369 to create a response 370 that is transmitted to the server 350. Although the third data 368 is processed into the fourth data 369, it is to be appreciated by one skilled in the art that the fourth data 369 may be identical, substantially similar, partially similar or completely different from the third data 368. It is to be further appreciated that the response 370 may be identical, substantially similar, partially similar or completely different from the fourth data 369. In an exemplary aspect of the present invention, the fourth data 369 is substantially similar to the response 370, except the response 370 includes data specific to communicating over a network, via a protocol (e.g., HTTP headers).

The response 370 can be processed by the server 350, and if the response 370 satisfies the authentication system employed by the server 350, then a resource 371 may be generated and returned to the web requestor 320. Although one request 362, one authentication challenge 363, one response 370 and one resource 371 are illustrated, it is to be appreciated by one skilled in the art that a greater number of requests 362, authentication challenges 363, responses 370 and resources 371 can be employed in accordance with the present invention. It is to be further appreciated that although a third data 368 was generated by the Ith authentication module $340_{AI}$, that no authentication module available to the authentication manager 330 may be able to produce third data responsive to the authentication challenge 363, and that an error code may be generated by the authentication modules and/or the authentication manager 330 to indicate that no response is forthcoming. It is to be further appreciated that although one exchange (e.g., 363, 368, 370) is illustrated, that more than one such exchange may occur before the resource 371 is returned from the server 350.

Although the request 362 is described as being generated in response to the application request 361, the system 300 may be employed to generate one or more pre-authentication challenge responses in response to one or more pre-authentication challenge test messages.

Figure 4:
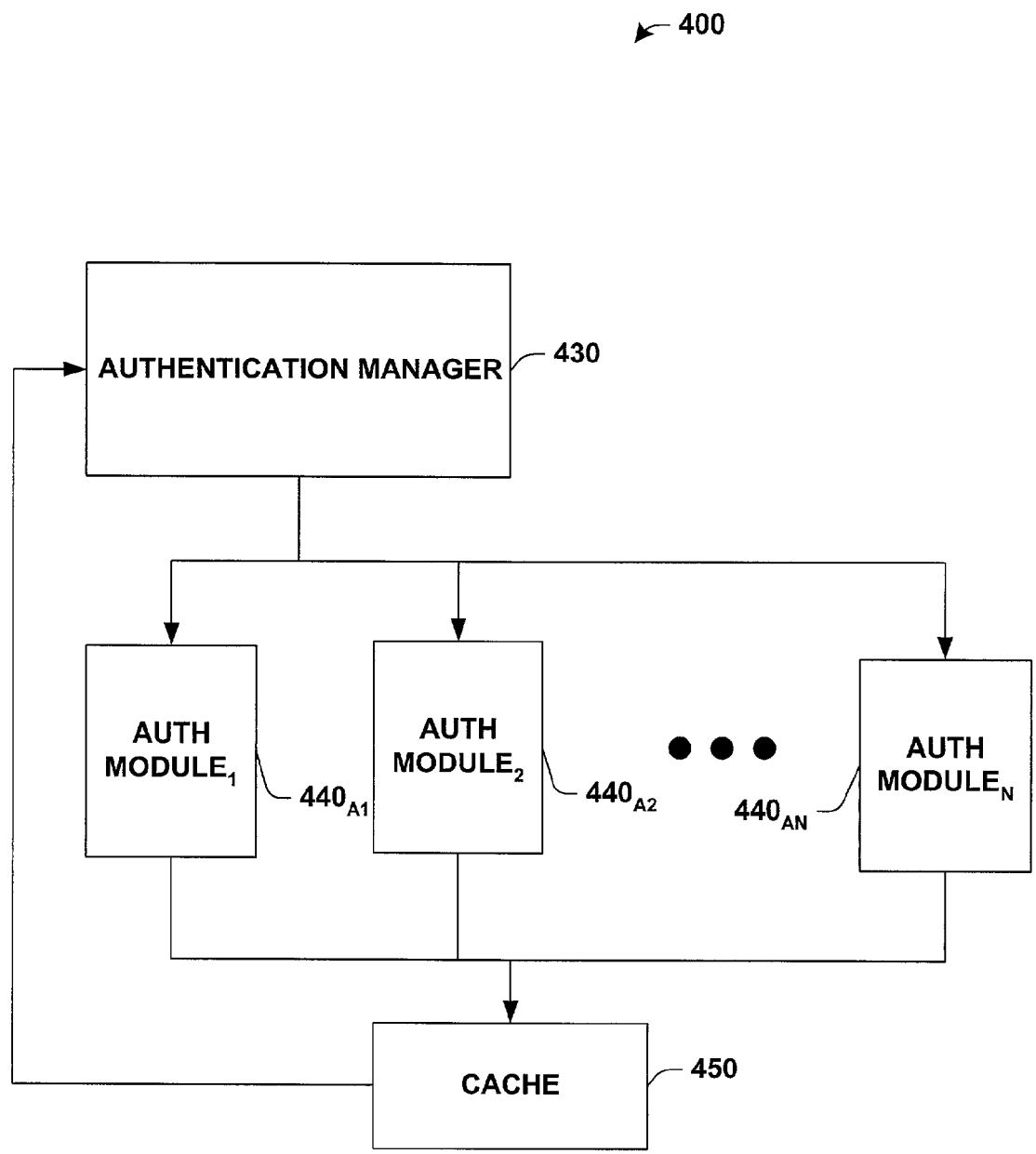
FIG. 4 is a schematic block diagram illustrating one example of the present invention wherein a cache is employed by an authentication manager to facilitate pre-authenticating a request, in accordance with an aspect of the present invention.

Thus, turning to FIG. 4, a system 400 that includes a cache 450 is illustrated. It is to be appreciated by one skilled in the art that FIG. 4, which incorporates the cache 450, illustrates an exemplary aspect of the present invention, and that other exemplary aspects of the present invention may not employ the cache 450. The cache 450 can be employed to store one or more responses generated by one or more authentication modules (e.g., $440_{A1}$, $440_{A2}$ through $440_{AN}$, N being an integer, collectively referred to as the authentication modules 440A). For example, an authentication module $440_{A1}$ may generate a first response to an authentication challenge, the response being stored in the cache 450, while a second authentication module $440_{A2}$ may generate a second and a third response that are similarly stored in the cache 450. Similarly, other of the authentication modules 440A may produce one or more responses that can be stored in the cache 450. The responses stored in the cache 450 may be generated in response to an authentication challenge. But the responses stored in the cache 450 may also be generated in response to a pre-authentication challenge test message. The authentication manager 430 may receive an authentication challenge from an authentication challenge generating component (e.g., server 350, FIG. 3) but the authentication manager 430 may also receive a pre-authentication challenge test message from a test message generating component (e.g., application 310, FIG. 3). The authentication manager 430 may then pass data associated with either the authentication challenge and/or the test message to one or more of the authentication modules 440A. The authentication modules 440A may be unaware of whether the data received was generated in response to an authentication challenge or was generated in response to a pre-authentication challenge test message. The authentication modules 440A can then place responses and/or error codes in the cache 450. The authentication manager 430 can then retrieve responses and/or error messages from the cache 450 to respond to the authentication challenge and/or the test message, as desired. Thus, asynchronous challenge/response message flow is facilitated, mitigating synchronous problems associated with conventional systems. A further advantage of the cache 450 is that responses and/or error codes can be generated to pre-authenticate a request. By way of illustration, the authentication manager 430 may become aware, through techniques including, but not limited to, predetermined programming and run time learning, that one or more authentication challenges are likely to be received, and that one or more responses to the anticipated authentication challenges are likely to be required. Thus, rather than waiting for the anticipated challenge to arrive, the authentication manager 430 may generate one or more desired responses before the anticipated challenge is received. The responses can be stored in the cache 450. Thus, the time to respond to an actual authentication challenge can be reduced since a candidate response has already been generated, and is waiting in the cache 450.

The authentication manager 430 may also generate pseudo-challenges on its own, not in response to an authentication challenge and/or test message. Again, the authentication modules 440A may not be aware of whether the data they receive is in response to an authentication challenge, a test message, or a pseudo-challenge. The authentication modules 440A process the data received and place responses and/or error codes in the cache 450. The authentication manager 430 can then retrieve the responses and/or error codes from the cache 450 as desired to continue pseudo-challenge processing. Storing responses in the cache 450 in response to a pseudo-challenge can reduce the time to respond to an actual authentication challenge. By generating one or more pre-authentication responses and storing them in the cache 450, response time can be improved because a response to an actual authentication challenge can be pulled from the cache 450, rather than having to be generated.

Figure 5:
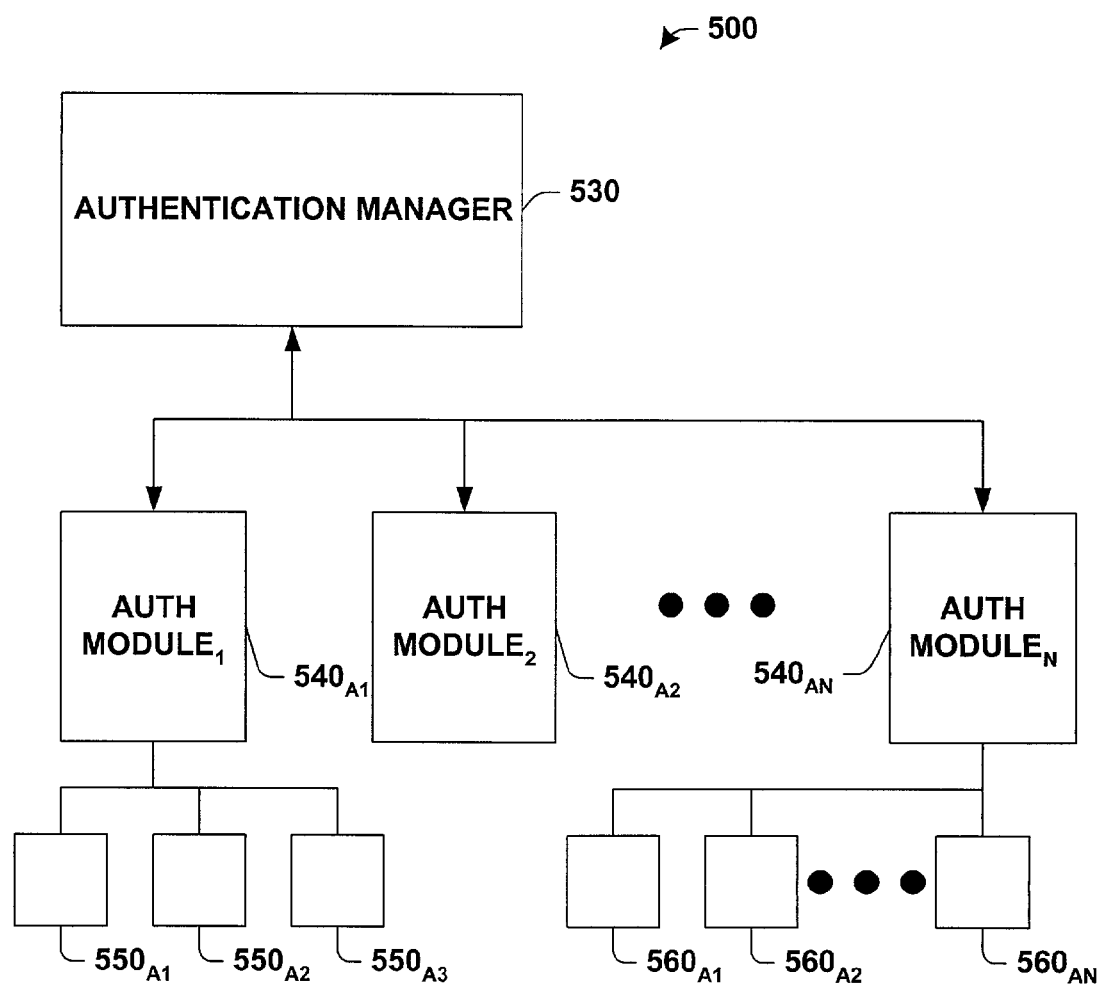
FIG. 5 is a schematic block diagram illustrating an authentication module employing additional services, in accordance with an aspect of the present invention.

Referring now to FIG. 5, a system 500 for enabling an application (e.g., 310, FIG. 3), to produce a response to an authentication challenge without incorporating code specific to an authentication system employed to generate the authentication challenge is illustrated. The system 500 includes an authentication manager 530 operable to distribute data associated with an authentication challenge to one or more authentication modules (e.g., $540_{A1}$, $540_{A2}$ through $540_{AN}$, collectively the authentication modules 540A). The authentication modules 540A can comprise, but are not limited to, one or more cooperating objects, a computer program, computer hardware, a process, one or more cooperating threads, and special purpose computer hardware. In an exemplary aspect of the present invention, the authentication modules 540A are instances of objects. Furthermore, the authentication modules 540A can employ one or more services in performing their functionality. By way of illustration, the first authentication module $540_{A1}$ may employ the services $550_{A1}$, $550_{A2}$ and $550_{A3}$ in performing their functionality. By way of further illustration, the second authentication module $540_{A2}$ may employ no services and the third authentication module $540_{AN}$ may employ the services $560_{A1}$, and $560_{A2}$ through $560_{AN}$, N being an integer, in performing their functionality. The services employed by the authentication modules 540A can include, but are not limited to, computer programs, processes, threads, objects, and computer hardware, whether located on a single computer or distributed among two or more computers.

Figure 6:
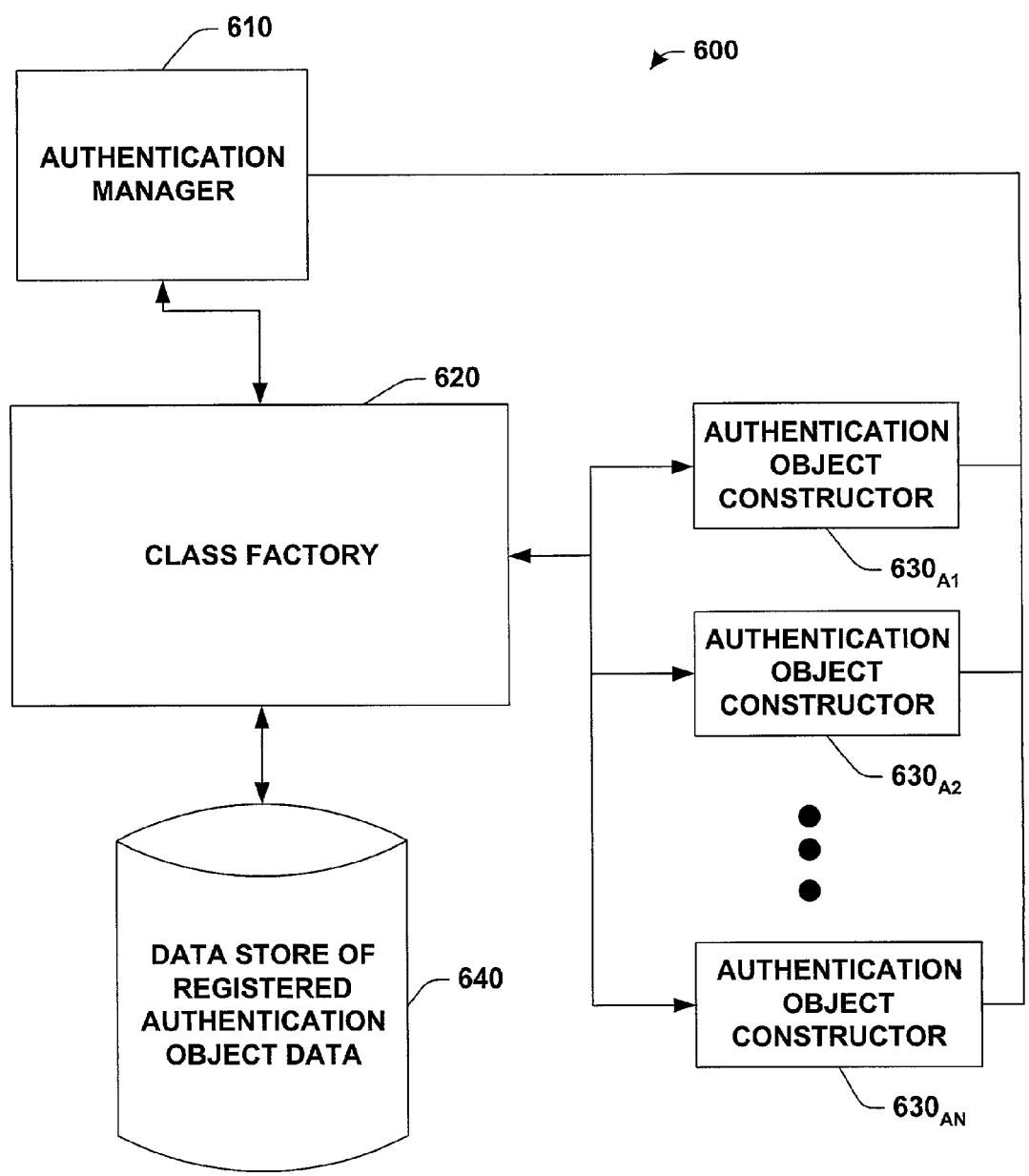
FIG. 6 is a schematic block diagram illustrating an authentication manager interacting with authentication object constructors and with information associated with the authentication objects stored in a data store, in accordance with an aspect of the present invention.

Referring now to FIG. 6, an exemplary system 600 for enabling an application (e.g., 310, FIG. 3), to produce a response to an authentication challenge without incorporating code specific to an authentication system employed to generate the authentication challenge is illustrated. The exemplary system 600 employs objects to produce responses to authentication challenges. Thus, the system 600 includes an interface 620 that authentication objects constructed by a first constructor 630$_{A1}$, and a second constructor 630$_{A2}$ through an Nth constructor 630$_{AN}$, N being an integer implement. The constructors 630$_{A1}$, and 630$_{A2}$ through 630$_{AN}$ can be referred to collectively as the constructors 630A. The constructors 630A can be employed to instantiate authentication objects. The authentication objects will implement the interface 620, and thus the authentication manager 610 will be able to interact with such objects. By way of illustration, the first constructor 630$_{A1}$ may be operable to produce one or more objects that facilitate producing a response to a first authentication challenge produced by a first authentication system (e.g., Kerberos). By way of further illustration, the second constructor 630$_{A2}$ may be operable to produce one or more objects that facilitate producing a response to a second authentication challenge produced by a second authentication system (e.g., Basic).

To facilitate producing responses to one or more authentication challenges, the application and/or the authentication manager 610 can request that one or more objects be created. While the application and/or the authentication manager 610 will generically request that an authentication object be produced, an appropriate constructor may be selected to instantiate an object based on data associated with an authentication challenge to which the application and/or authentication manager 610 desires to respond. By way of illustration, if the application and/or authentication manager 610 seeks to respond to an authentication challenge generated by a Kerberos system, then a first constructor may be employed to produce an object operable to respond to the Kerberos system but if the application and/or authentication manager 610 seeks to respond to an authentication challenge generated by a Basic system, then a second constructor may be employed to produce an object operable to respond to the Basic system. Thus, in the example presented, the application and/or authentication manager 610 may examine data associated with an authentication challenge to determine which constructor to employ. The data associated with the authentication challenge can be an input to the application and/or authentication manager 610 (e.g., a string received from a server). The string can be employed by generic constructing code that invokes the constructing operations of the appropriate constructor. Thus, the application and/or the authentication manager 610 can be substantially insulated from authentication system specific actions, thereby mitigating flexibility problems associated with conventional systems.

The authentication manager 610 can access a data store 640 of registered authentication object data to facilitate determining which, if any, constructor to employ to create objects operable to respond to an authentication challenge. By way of illustration, the data store 640 of registered authentication object data may store items including, but not limited to, a list of constructors associated with one or more authentication systems, a list of constructors associated with one or more authentication challenges and a list of rules for selecting a constructor based on an authentication challenge. While the previous sentence refers to lists, it is to be appreciated by one skilled in the art that the data store 640 can employ other data structures including, but not limited to, an array, a table, a database, a stack, a heap, a linked list, a heap and a data cube.

Figure 7:
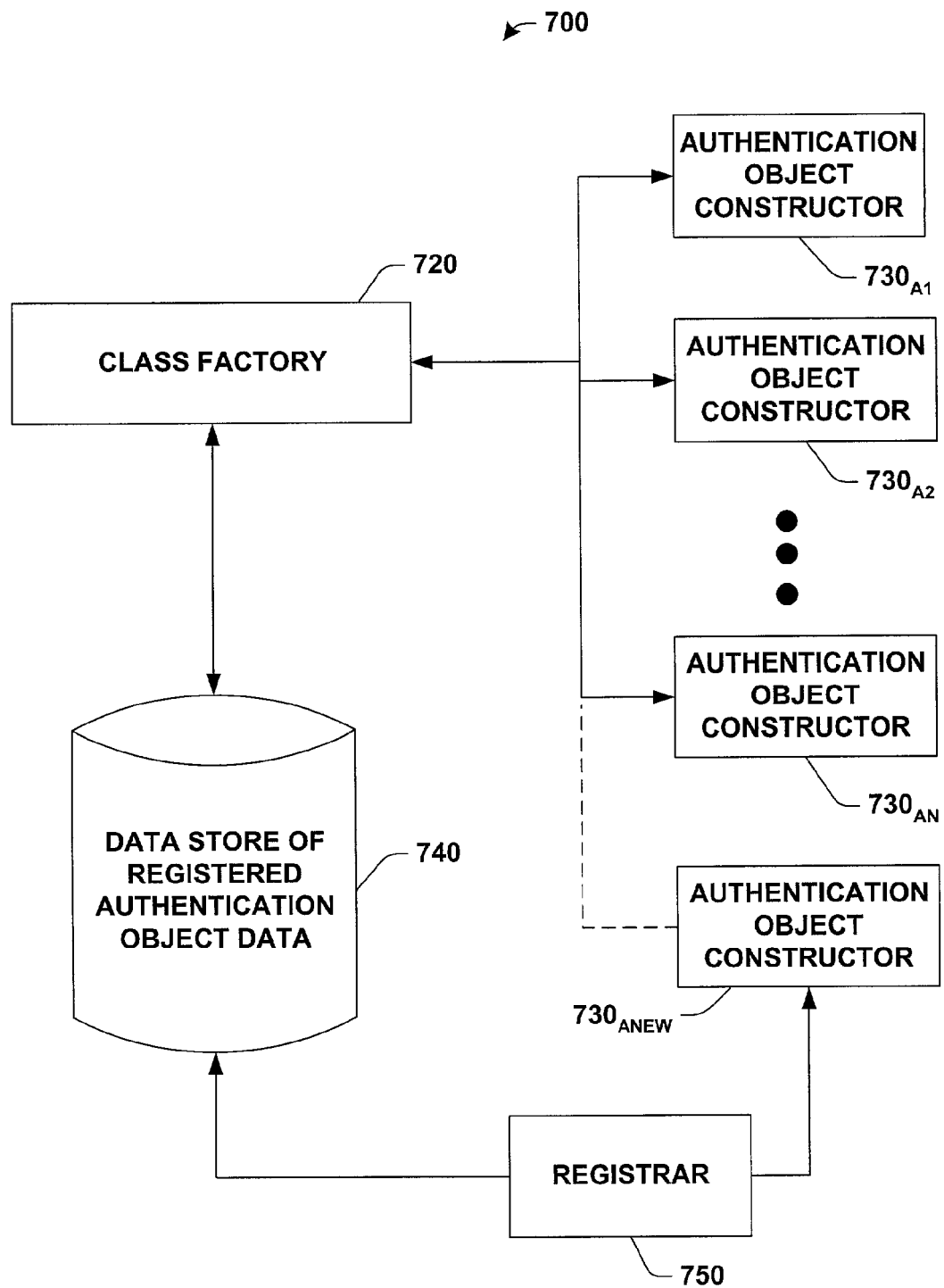
FIG. 7 is a schematic block diagram illustrating a registrar being employed to add an additional authentication object constructor to a set of authentication modules that are available to be employed by an authentication manager, in accordance with an aspect of the present invention.

One problem with conventional systems was the difficulty with which such systems responded to new authentication systems, typically requiring recoding and recompilation of programs when new authentication systems were introduced. Thus, turning to FIG. 7, a system 700 for registering new authentication object constructors with an authentication manager 720 is illustrated. The authentication manager 720 can function as a class factory, facilitating the creation of authentication objects. The new constructors may be operable to produce authentication objects operable to facilitate producing a response to an authentication challenge generated by a new authentication system. Before the addition of a new constructor 730$_{ANEW}$ and related registered authentication object information, the authentication manager 720 had access to a first constructor 730$_{A1}$ and a second constructor 730$_{A2}$ through an Nth constructor 730$_{AN}$, N being an integer (collectively the constructors 730A). The first constructor 730$_{A1}$ may be operable to produce one or more authentication objects associated with responding to a first authentication system (e.g., Kerberos), while the second constructor 730$_{A2}$ may be operable to produce one or more authentication objects associated with a second authentication system (e.g., Basic). The authentication objects produced by the constructors 730A implement a common interface known by the authentication manager 720, which facilitates communication with the authentication objects. Information sufficient to determine which constructor, if any, is appropriate to employ to construct one or more authentication objects to facilitate responding to an authentication challenge can be stored in a data store 740 of registered authentication object data. The data store 740 may store items including, but not limited to, a list of constructors associated with one or more authentication systems, a list of constructors associated with one or more authentication challenges and a list of rules for selecting a constructor based on an authentication challenge. While the previous sentence refers to lists, it is to be appreciated by one skilled in the art that the data store 740 can employ other data structures including, but not limited to, an array, a table, a database, a stack, a heap, a linked list, a heap and a data cube.

The system 700 includes a registrar 750 operable to make one or more authentication object constructors available to the authentication manager 720. When the registrar 750 desires to make a new authentication object constructor available to the authentication manager 720 set of authentication objects for which constructors are available, the registrar 750 will take at least two actions. The registrar 750 will produce a new constructor 730$_{ANEW}$, and the registrar 750 will register the new constructor 730$_{ANEW}$ with the data store 740. Registering the new constructor 730$_{ANEW}$ with the data store 740 may involve updating items including, but not limited to, a list of constructors associated with one or more authentication systems, a list of constructors associated with one or more authentication challenges and a list of rules for selecting a constructor based on an authentication challenge. While the previous sentence refers to lists, it is to be appreciated by one skilled in the art that updating the data store 740 can involve updating other data structures including, but not limited to, an array, a table, a database, a stack, a heap, a linked list, a heap and a data cube. Once the data store 740 is updated, then the authentication manager 720 can employ the new constructor 730$_{ANEW}$ to create authentication objects operable to respond to the new authentication system. Adding a new constructor 730$_{ANEW}$ operable to produce authentication objects associated with the new authentication system can thus be completed without requiring changes to an application (e.g., 310, FIG. 3). To acquire an authentication object created by the new constructor $730_{ANEW}$, an application (e.g., 310, FIG. 3) could employ generic constructor code, passing a parameter associated with the new constructor $730_{ANEW}$, and thus the application would not require recompilation, thus mitigating lifespan problems associated with conventional systems. An application (e.g., 310, FIG. 3) may not even be aware that the new constructor $730_{ANEW}$ became available. By way of illustration, acquiring an authentication object operable to facilitate producing a response to an authentication challenge produced by a new authentication system may involve receiving a data input (e.g., an authentication challenge from the server) and passing the authentication challenge and/or data associated with the authentication challenge to an authentication manager (e.g., 610, FIG. 6). The authentication manager will employ existing generator code that will access the authentication manager 720.

To acquire an authentication object created by the new constructor $730_{ANEW}$, the authentication manager 720 could examine data associated with an authentication challenge to facilitate determining that the new constructor $730_{ANEW}$ was available and appropriate for producing a response to the authentication challenge, and which would further be responsible for invoking the new constructor $730_{ANEW}$ and returning the authentication object created by the new constructor $730_{ANEW}$. The authentication manager 720 will be able to interact with the new constructor $730_{ANEW}$ and thus the application will be able to interact with an authentication object created by the new constructor $730_{ANEW}$ if the new constructor implements a set of methods defined in an abstract network base class. Such abstract base class enabled access to the new constructor can thus be accomplished with no changes to the application program, facilitating lifecycle and complexity problems associated with conventional systems.

Figure 8:
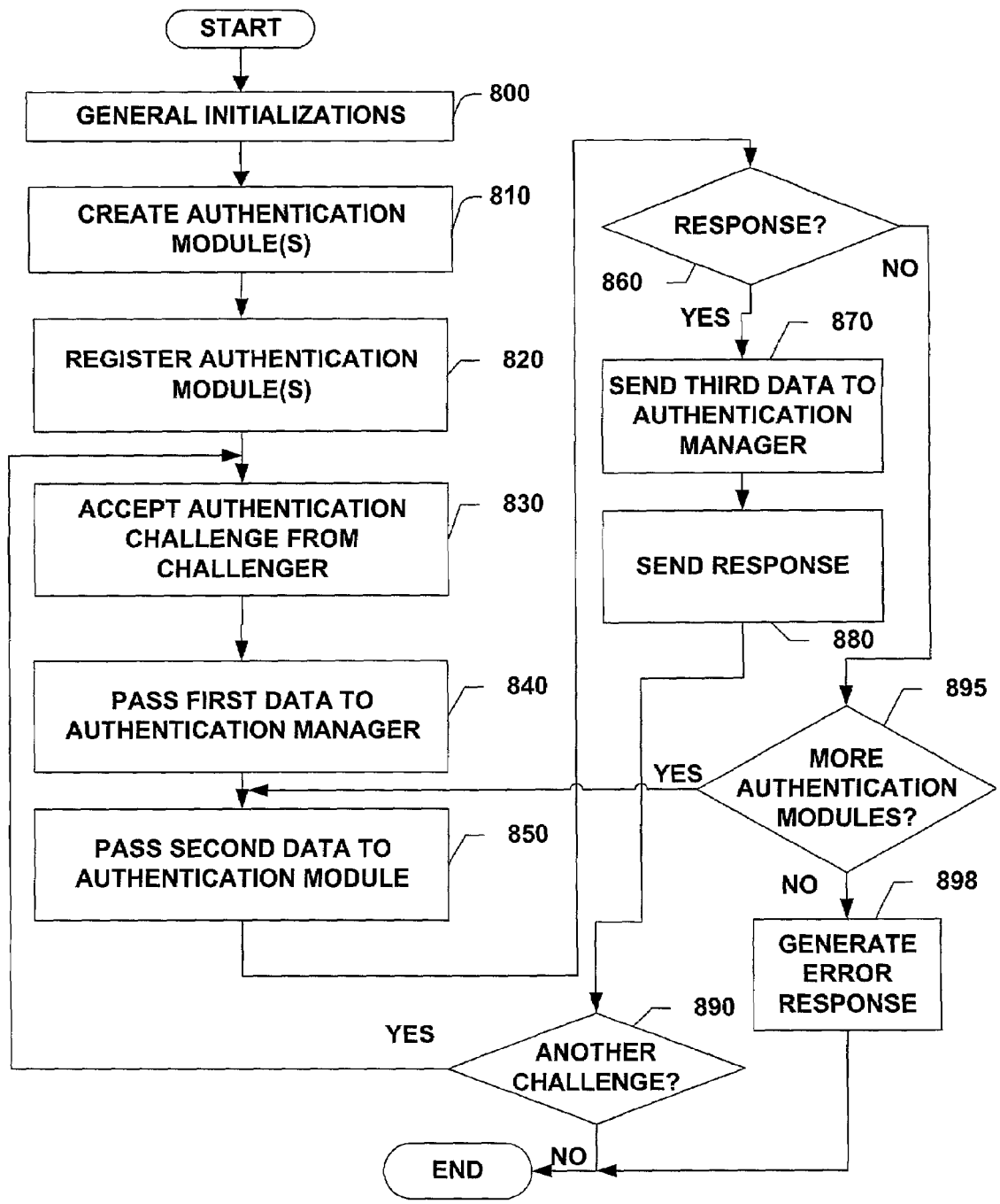
FIG. 8 is a flow chart illustrating an example methodology for practicing an aspect of the present invention.

In view of the exemplary systems shown and described above, methodologies, which may be implemented in accordance with the present invention, will be better appreciated with reference to the flow diagram of FIG. 8. While for purposes of simplicity of explanation, the methodology of FIG. 8 is shown and described as a series of blocks representative of acts and/or events in accordance with the present invention, it is to be understood and appreciated that the present invention is not limited by the order and/or number of blocks, as some blocks may, in accordance with the present invention, occur in different orders and/or concurrently with other blocks from that shown and described herein. Moreover, not all illustrated blocks may be required to implement a methodology in accordance with the present invention.

FIG. 8 is a flow chart illustrating one exemplary method for producing a response to an authentication challenge. At 800, general initializations occur. Such initializations include, but are not limited to, allocating memory, establishing pointers, establishing data communications, acquiring resources, setting variables and displaying process activity. At 810, one or more authentication modules are created. The authentication modules can be operable to produce a response to an authentication challenge from one or more authentication systems. At 820, the authentication modules of 810 are registered. Such registering can include updating information in a data store employed to facilitate instantiating one or more instances of an authentication module.

At 830 an authentication challenge is accepted from a request challenger. At 840, first data associated with authentication challenge is passed to an authentication manager. The first data may include all, substantially all, a portion, or none of the authentication challenge received from the request challenger. At 850, second data associated with the authentication challenge is passed to an authentication module. The second data may include all, substantially all, a portion, or none of the authentication challenge received from the request challenger.

At 860, a determination is made concerning whether the authentication module of 850 was able to produce a response to the authentication challenge. If the determination at 860 is YES, then at step 870 third data associated with the response generated by the authentication module is sent to the authentication manager. At 880, a response to the authentication challenge of 830 is sent to the request challenger, such response based, at least in part, on the third data generated by the authentication module. At 890, a determination is made concerning whether there is another challenge to be processed. If the determination at 890 is YES, then processing continues at 830. If the determination at 890 is NO, then processing concludes. If the determination at 860 is NO, that the authentication module of 850 was unable to produce a third data responsive to the authentication challenge of 830, then at 895 a determination is made concerning whether there is another authentication module available to try to produce a third data responsive to the authentication challenge of 830. If the determination at 895 is YES, then processing continues at 850, with the second data being passed to the authentication module identified at 895. If the determination at 895 is NO, then at 898 an error response can be generated indicating that the challenge of 830 cannot be survived.

Figure 9:
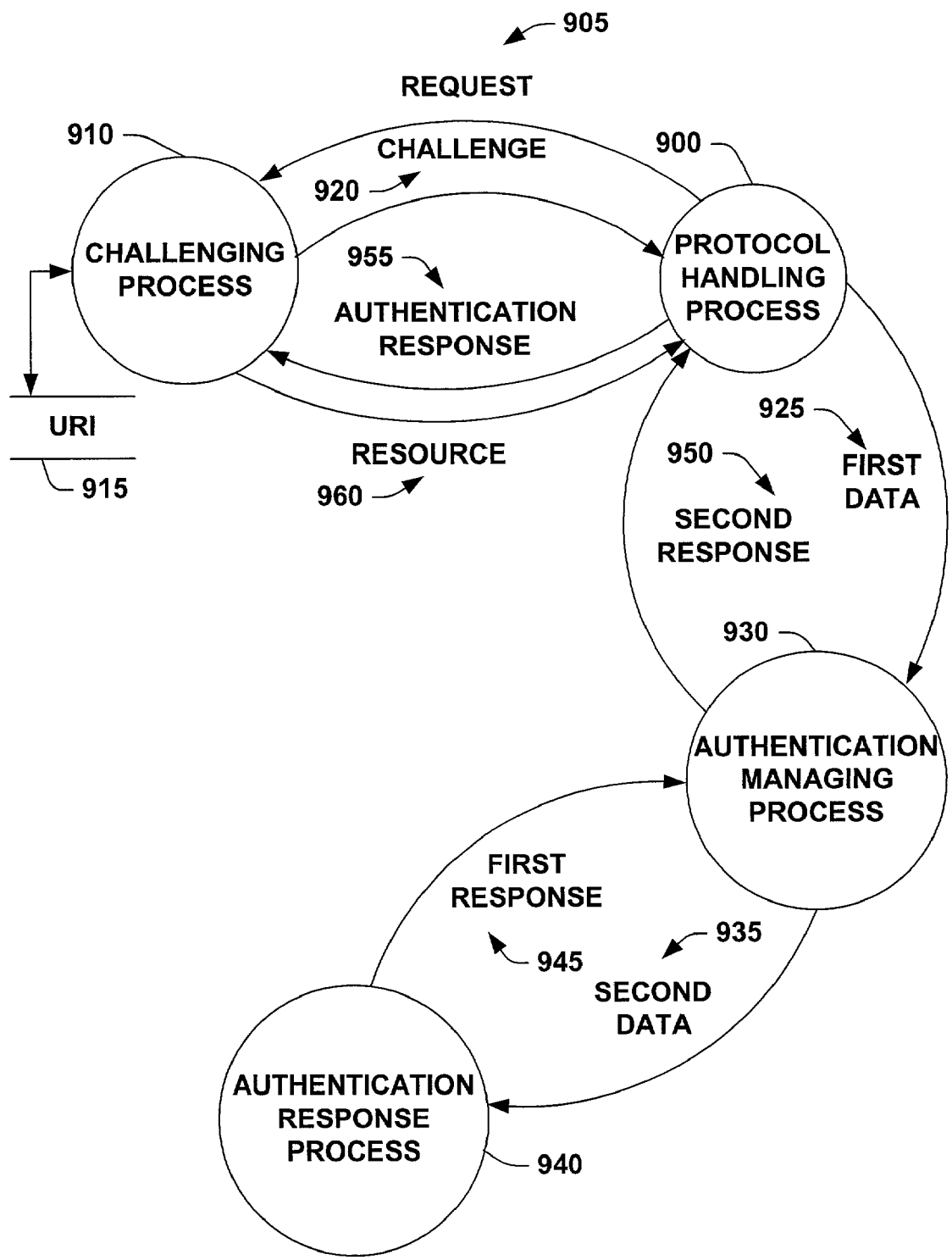
FIG. 9 is a data flow diagram illustrating an example data flow through an aspect of the present invention.

FIG. 9 illustrates a sample data flow through an aspect of the present invention. A protocol handling process 900 may format and deliver a request 905 to access a URI to a challenging process 910. Alternatively, the request 905 may be formatted and delivered by an application, however, for purposes of this illustration, the application will employ a protocol handling process operable to remove protocol specific details from the application. The challenging process 910 receives the request 905 that includes a URI, and compares the URI to information concerning one or more URIs in a data store 915. The information stored in the data store 915 can be employed to determine whether the challenging process 910 should issue an authentication challenge 920 in response to the request 905. If the challenging process 910 determines that an authentication challenge 920 should be issued, then the challenging process 910 generates the authentication challenge 920 and delivers it to the protocol handling process 900. The protocol handling process may then process the authentication challenge 920 and produce a first data 925 that is delivered to an authentication managing process 930. The first data 925 can include, all, substantially all, a portion or none of the authentication challenge 920. In addition, the first data 925 can include additional data generated by the protocol handling process 900. Furthermore, the protocol handling process 900 can remove headers, footers and/or formatting characters, for example, from the authentication challenge 920 before producing the first data 925.

The authentication managing process 930 can then process the first data 925 to produce a second data 935. The second data 935 can include all, substantially all, a portion or none of the first data 925. In addition, the second data 935 can include additional data generated by the authentication managing process 930. For example, the authentication managing process 930 may add data to the second data 935 to facilitate synchronizing responding to the authentication challenge 920. The second data 935 is delivered to one or more authentication response processes 940 that are operable to produce a first response 945, the first response 945 related to the second data 935, and thus to the authentication challenge 920. The first response 945 may be an error code indicating that the authentication response process 940 is unable to produce a response to the second data 935, or the first response 945 may be data that can be employed to produce an authentication response 955 that will be delivered to the challenging process 910 in response to the authentication challenge 920.

The first response 945 is returned to the authentication managing process 930, which processes the first response 945 to produce a second response 950. The second response 950 may be an error code, indicating that the authentication managing process 930 and/or the authentication response process 940 were unable to produce a response to the first data 925, or the second response 950 may be data that can be employed to produce the authentication response 955 that will be delivered to the challenging process 910 in response to the authentication challenge 920. The protocol handling process 900 receives the second response 950 and formats the authentication response 955 that can be delivered over a network to the challenging process 910. In an alternative data flow, the second response 950 may be delivered to an application that will format the authentication response 955.

The authentication response 955 will be received by the challenging process 910 and if the authentication response 955 satisfies the authentication system employed by the challenging process 910, then a resource 960 may be delivered to the protocol handling process 900. Although synchronous, error free data communications and data flow are illustrated in FIG. 9, it is to be appreciated by one skilled in the art that techniques including, but not limited to, synchronous communications, asynchronous communications, timeout processing and retry processing may be employed in accordance with the present invention.

Figure 10:
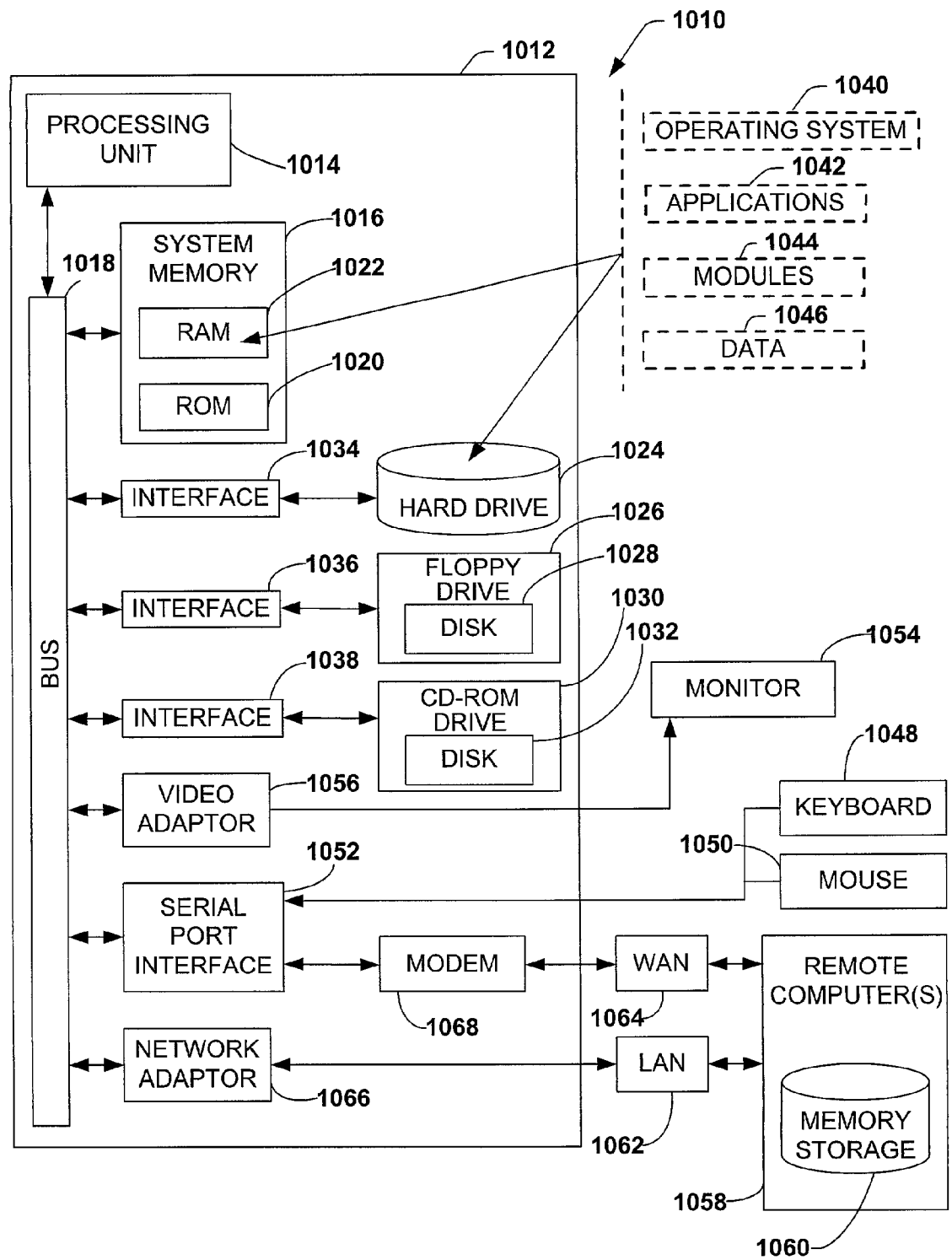
FIG. 10 is a schematic block diagram of an exemplary operating environment for a system configured in accordance with the present invention.

FIG. 10 is a schematic block diagram of an exemplary operating environment for a system configured in accordance with the present invention. In order to provide additional context for various aspects of the present invention, FIG. 10 and the following discussion provide a brief, general description of a suitable computing environment 1010 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules comprise, but are not limited to, routines, programs, processes, threads, components, and data structures that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference to FIG. 10, an exemplary environment 1010 for implementing various aspects of the invention includes a computer 1012, the computer 1012 including a processing unit 1014, a system memory 1016 and a system bus 1018. The system bus 1018 couples system components including, but not limited to, the system memory 1016 to the processing unit 1014. The processing unit 1014 may be any of various commercially available processors. Dual microprocessors and other multi-processor architectures also can be employed as the processing unit 1014.

The system bus 1018 can be any of several types of bus structure including a memory bus or memory controller, a peripheral bus and a local bus using any of a variety of commercially available bus architectures. The system memory 1016 includes read only memory (ROM) 1020 and random access memory (RAM) 1022. A basic input/output system (BIOS), containing the basic routines that help to transfer information between elements within the computer 1012, such as during start-up, is stored in ROM 1020.

The computer 1012 further includes a hard disk drive 1024, a magnetic disk drive 1026, (e.g., to read from or write to a removable disk 1028) and an optical disk drive 1030, (e.g., for reading a CD-ROM disk 1032 or to read from or write to other optical media). The hard disk drive 1024, magnetic disk drive 1026 and optical disk drive 1030 can be connected to the system bus 1018 by a hard disk drive interface 1034, a magnetic disk drive interface 1036 and an optical drive interface 1038, respectively. The drives and their associated computer-readable media provide nonvolatile storage of data, data structures, computer-executable instructions, etc. for the computer 1012, including for the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 1022, including an operating system 1040, one or more application programs 1042, other program modules 1044 and program data 1046. It is to be appreciated that the present invention can be implemented with various commercially available operating systems or combinations of operating systems.

A user can enter commands and information into the computer 1012 through a keyboard 1048 and a pointing device, such as a mouse 1050. Other input devices (not shown) may include a microphone, an IR (Infrared) remote control, a joystick, a game pad, a satellite dish, cameras, in the sense of gesture interpreted through cameras and machine-vision software, a scanner, or the like. These and other input devices are often connected to the processing unit 1014 through a serial port interface 1052 that is coupled to the system bus 1018, but may be connected by other interfaces, such as a parallel port, a game port, a universal serial bus ("USB"), an IR interface, etc. A monitor 1054 or other type of display device is also connected to the system bus 1018 via an interface, such as a video adapter 1056. In addition to the monitor, a computer typically includes other peripheral output devices (not shown), such as speakers, printers etc.

The computer 1012 may operate in a networked environment using logical connections to one or more remote computers, such as a remote computer(s) 1058. The remote computer(s) 1058 may be a workstation, a server computer, a router, a personal computer, microprocessor based entertainment appliance, a peer device or other common network node, and typically includes many or all of the elements described relative to the computer 1012, although, for purposes of brevity, only a memory storage device 1060 is illustrated. The logical connections depicted include a local area network (LAN) 1062 and a wide area network (WAN) 1064. Such networking environments are commonplace in offices, enterprise-wide computer networks, intranets and the Internet.

When used in a LAN networking environment, the computer 1012 is connected to the local network 1062 through a network interface or adapter 1066. When used in a WAN networking environment, the computer 1012 typically includes a modem 1068, or is connected to a communications server on the LAN, or has other means for establishing communications over the WAN 1064, such as the Internet. The modem 1068, which may be internal or external, is connected to the system bus 1018 via the serial port interface 1052. In a networked environment, program modules depicted relative to the computer 1012, or portions thereof, may be stored in the remote memory storage device 1060. It will be appreciated that the network connections shown are exemplary and other means of establishing a communications link between the computers may be used.

Figure 11:
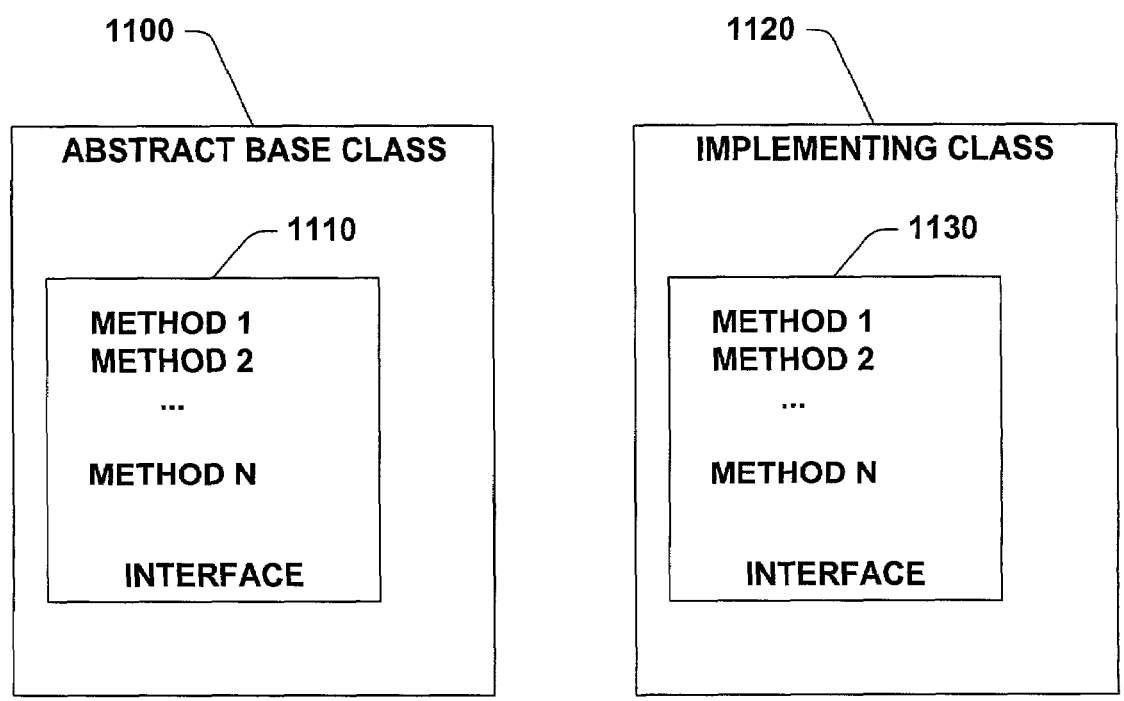
FIG. 11 illustrates an abstract base class and an implementing class, in accordance with an aspect of the present invention.

Producing authentication objects that can employed to facilitate producing a response to an authentication challenge is facilitated by employing an abstract authentication object base class that authentication object programmers can implement. Thus, turning to FIG. 11, an abstract base class 1100 and a implementing class 1120 that inherits from the abstract base class 1100 and which implements the abstract base class 1100 are illustrated. It is to be appreciated by one skilled in the art that the implementing class 1120 can provide the functionality of an authentication challenge response producing object. The abstract base class 1100 defines an interface 1110, which includes N methods, N being an integer. The abstract base class 1100 may also define one or more properties. The implementing class 1120 inherits from the abstract base class 1100, and implements the interface 1110. In an abstract base class, methods are defined but not implemented. The present invention employs such abstract base classes to define an interface that protocol handler classes can implement. Providing such an interface facilitates creating an authentication system that can be included in existing applications without requiring such applications to be rewritten and/or recompiled, mitigating problems associated with conventional systems.

The interface 1110 can have methods including, but not limited to, methods for creating an object, methods for receiving an authentication challenge, methods for receiving data associated with an authentication challenge, methods for producing a response to an authentication challenge and methods for determining whether a response to an authentication challenge can be produced. It is to be appreciated by one skilled in the art that some methods may be visible to a program interacting with an implementing class object 1120 (e.g., produce response to authentication challenge) while other methods may not be visible to such a program (e.g., create object). It is to be further appreciated that some methods (e.g., creator methods) may be invoked by a class factory (e.g., 620, FIG. 6). The implementation of the interface 1110 by the implementing object 1120 facilitates implementing class factory functionality, with such functionality being removed from an application program, which thus mitigates application program complexity and size problems.

Figure 12:
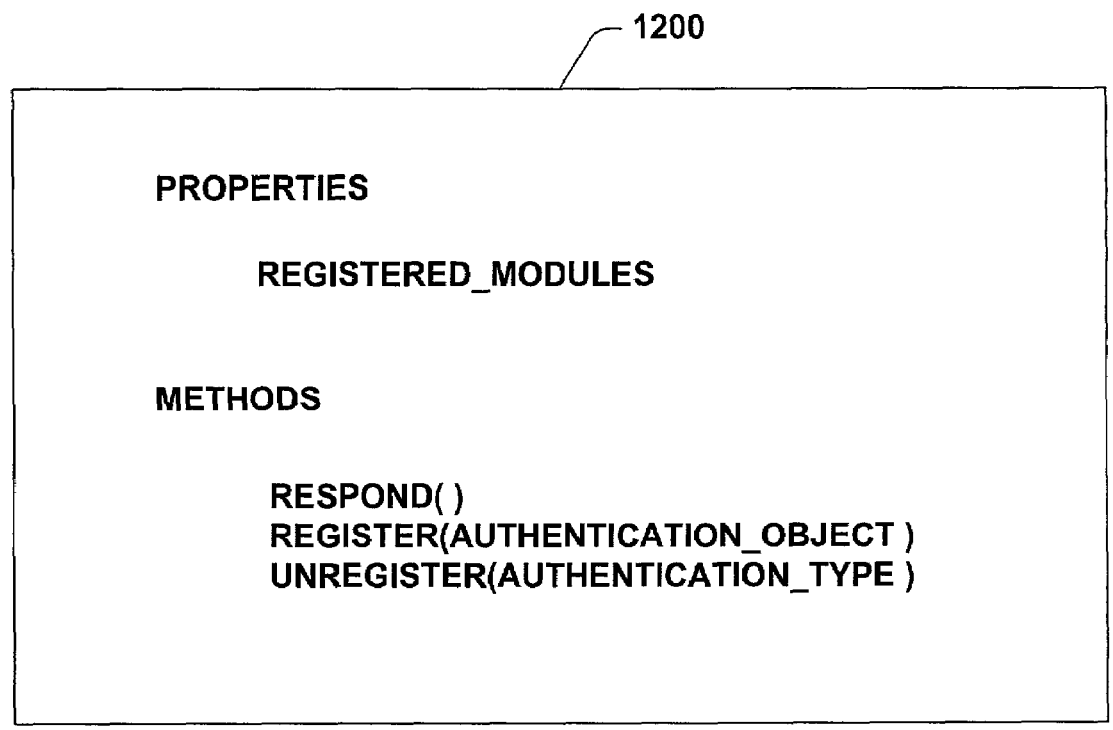
FIG. 12 illustrates an exemplary authentication manager abstract base class, in accordance with an aspect of the present invention.

FIG. 12 illustrates an exemplary authentication manager abstract base class definition 1200. The authentication manager abstract base class definition 1200 facilitates creating and managing objects designed to simplify producing a response to an authentication challenge. The abstract base class can be, for example a NET_AUTHENTICATION_MANAGER object. The base class definition 1200 can include properties and methods. The properties can include, but are not limited to a REGISTERED_MODULES property. The methods can include, but are not limited to, a AUTHENTICATE( ) method, a REGISTER(AUTHENTICATION_OBJECT) method, and an UNREGISTER(AUTHENTICATION_TYPE)method. While one property and three methods are illustrated in FIG. 12, it is to be appreciated by one skilled in the art that a greater or lesser number of properties and/or methods can be employed in an authentication manager object in accordance with the present invention.

The REGISTERED_MODULES property may hold, for example, a list of strings containing identifiers (e.g., authentication system names) of authentication objects registered with an authentication manager. Such a list may be employed to associate authentication objects with authentication systems, for example. Thus, data stored in the properties can be employed to facilitate producing a response to one or more authentication challenges by storing information employed in facilitating such responses. Storing such information in an authentication manager object implementing an abstract base class definition facilitates reducing application program complexity by removing such authentication system specific information from the application program, thus mitigating complexity problems associated with conventional systems.

The AUTHENTICATE( ) method can be employed, for example, when an authentication challenge is received and data associated with the authentication challenge is presented to the authentication manager. The authentication manager can employ the AUTHENTICATE( ) method as overloaded in one or more authentication objects to invoke functionality in the authentication objects. An application invoking the generic AUTHENTICATION_MANAGER class AUTHENTICATE( ) method is thus substantially insulated from such authentication specific AUTHENTICATE( ) methods, thus mitigating lifecycle and flexibility problems associated with conventional systems. The REGISTER(AUTHENTICATION_OBJECT) method can be employed, for example, to register an authentication object in a class factory data store (e.g., 640, FIG. 6) to facilitate an authentication manager instantiating one or more authentication objects operable to respond to one or more authentication challenges from one or more authentication systems. Conversely, the UNREGISTER(AUTHENTICATION_TYPE) method can be employed, for example, to deregister one or more authentication objects in a class factory data store (e.g., 640, FIG. 6) when responding to an authentication system is no longer required. Authentication objects can be removed, for example, based on the type of authentication challenge to which they can respond. By way of illustration, an UNREGISTER(Kerberos) method call may be employed to unregister authentication objects that are operable to respond to Kerberos authentication system authentication challenges. Moving such functionality to methods implementing an abstract base class facilitates simplifying application programs and thus mitigates complexity problems associated with conventional systems by providing a generic interface to an application program, with specific implementations of the generic interface being supplied by authentication system specific objects.

Figure 13:
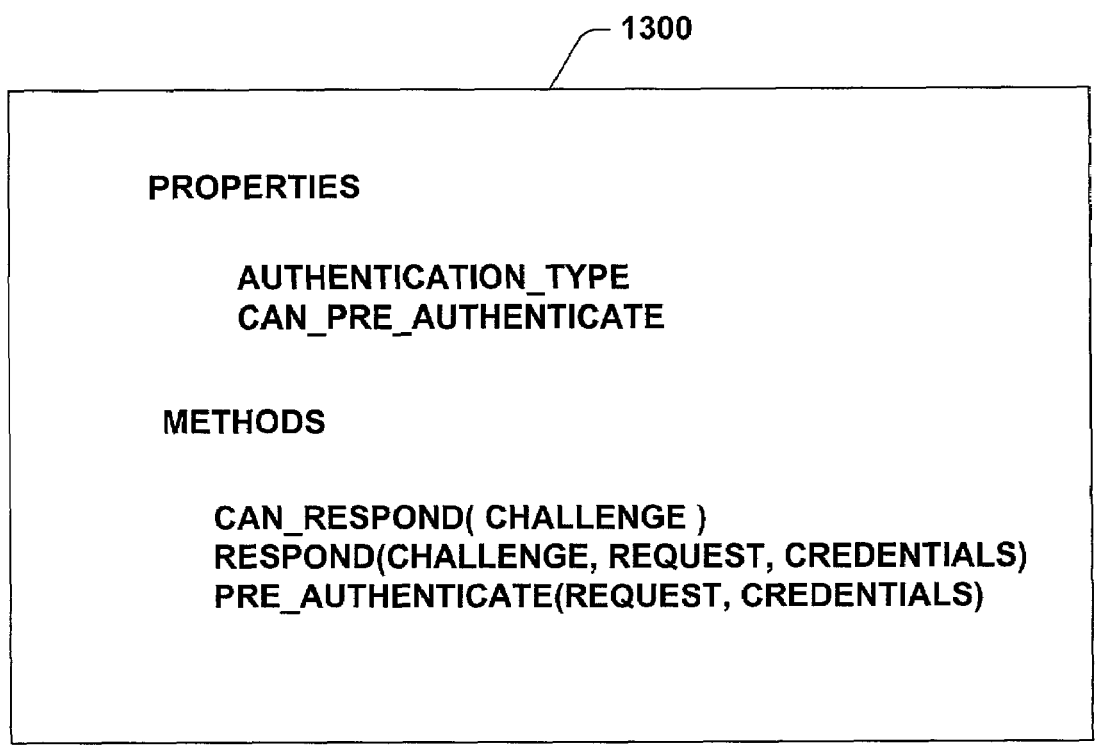
FIG. 13 illustrates an exemplary authentication module abstract base class, in accordance with an aspect of the present invention.

FIG. 13 illustrates an exemplary abstract base class definition 1300 for an object designed to simplify producing a response to an authentication challenge. The abstract base class may include properties and methods. The properties can include, but are not limited to, an AUTHENTICATION_TYPE property and a CAN_PREAUTHENTICATE property. The methods can include, but are not limited to, a CAN_RESPOND(CHALLENGE) method, a RESPOND(CHALLENGE, REQUEST, CREDENTIALS) method and a PRE_AUTHENTICATE(REQUEST, CREDENTIALS) method.

The AUTHENTICATION_TYPE property may hold, for example, a string identifying one or more authentication systems to which the authentication module can produce a response. The CAN_PREAUTHENTICATE property may hold, for example, a Boolean value describing whether the authentication object is operable to pre-authenticate a pre-authentication challenge test message and/or a pseudo-challenge. Thus, data stored in the properties can be employed to facilitate producing a response to one or more authentication challenges produced by one or more authentication systems. Storing such information in properties in authentication objects that implement the abstract base class facilitates reducing application program complexity by removing such authentication system specific information from the application program, thus mitigating complexity problems associated with conventional systems. Storing such information in properties in authentication objects further facilitates making a new authentication system available to an application by providing an interface to which the new authentication system programmer can code.

The CAN_RESPOND(CHALLENGE) method may, for example, return a Boolean value indicating whether the authentication object is operable to produce a response to the authentication system challenge identified in the CHALLENGE parameter. The CAN_RESPOND(CHALLENGE) method may employ one or more properties stored in the authentication object to make its determination, thus simplifying application program code, which will not be required to make such a determination. Moving such functionality to methods implementing an abstract base class definition facilitates simplifying application programs and thus mitigates complexity problems associated with conventional systems. For example, an application may request a response to a challenge by passing the challenge to an authentication manager, which will selectively pass the challenge to the authentication modules, thus removing such distribution and management from the application. If the CAN_RESPOND(CHALLENGE) method returns a Boolean true value, then an authentication manager may invoke the respond method for the authentication object to generate a response to an authentication challenge. Thus, the RESPOND(CHALLENGE, REQUEST, CREDENTIALS) method may, for example, return a response to a challenge identified in the CHALLENGE parameter, to a protocol handling object identified in the REQUEST parameter. The CREDENTIALS parameter may hold, for example, security information (e.g., username, password, domain) associated with the challenge identified in the CHALLENGE parameter). Thus, the authentication object may have information available to produce a response that can be deposited in a cache and retrieved at a later time, where the response may be identifiable by such security information. The ability to store responses in a cache facilitates pre-authenticating responses and facilitates asynchronous responses. Thus, the PRE_AUTHENTICATE(REQUEST, CREDENTIALS) method is provided. The PRE_AUTHENTICATE(REQUEST, CREDENTIALS) method can be employed, for example, to accept a pre-authentication test message and/or pseudo-challenge for a user identified by security information (e.g., username, password, domain) and produce a response that can be stored, for example, in a cache of responses. Thus, pre-authentication is facilitated, which in turn facilitates asynchronous communication, and which can improve performance of an authentication challenge response system. For example, an authentication manager may generate a plurality of pseudo-challenges associated with a user identified by security information (e.g., username, password, domain) and store the responses in a cache. The plurality of pseudo-challenges may be made in response to receiving authentication challenges from one or more authentication systems. Thus, when an actual authentication challenge is received, the authentication manager can retrieve a pre-generated response, which may be faster than employing the authentication processes available through the authentication objects. Thus, overall response time can be improved.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising", as comprising is interpreted as a transitional word in a claim.

What is claimed is:

1. A computer implemented system that utilizes a processor and that facilitates an application to produce a response to an authentication challenge, comprising the following computer executable components:

a learning component that determines anticipated authentication challenges to resource requests from applications based upon run-time learning during previous resource requests by applications;

an authentication manager that receives first data associated with the communication challenge and processes the first data into second data of a first type appropriate for a first authentication module, the authentication manager further communicates the second data to at least one authentication module, the authentication manager further communicates the second data to the at least one different authentication module if the first module is unable to process the authentication challenge, the second data is related to the first data and the authentication challenge, the authentication manager also generates one or more pseudo-challenges of its own not in response to the authentication challenge and communicates the data associated with the pseudo-challenges to at least one authentication module;

at least one authentication module that receives the second data from the authentication manager and produces third data related to responding to the authentication challenge; and a cache that stores one or more third data related to responding to the authentication challenge and the one or more pseudo-challenges.

2. The system of claim 1, wherein the authentication manager receives a set of first data associated with a multipart authentication challenge, to process the set of first data into a set of the second data, and communicates the set of second data to at least one authentication module, the set of second data is related to the set of first data and the multipart authentication challenge.

3. The system of claim 2, wherein the at least one authentication module receives the set of second data from the authentication manager and produces a set of third data related to responding to the multipart authentication challenge.

4. The system of claim 3, wherein the cache stores a set of third data related to responding to the multipart authentication challenge.

5. The system of claim 1, wherein:
the authentication manager accepts a pre-authentication challenge test message associated with an anticipated authentication challenge, processes the test message into a pre-authentication challenge test data, and communicates the pre-authentication challenge test data to at least one authentication module, the pre-authentication challenge test data related to the pre-authentication challenge test message; at least one authentication module receives the pre-authentication challenge test data from the authentication manager and produces a pre-authentication challenge test response data related to responding to the pre-authentication challenge test message; and
the cache stores one or more pre-authentication challenge test response data related to responding to the pre-authentication challenge test message, the cache selectively provides the pre-authentication challenge test response data upon request by the authentication manager.

6. The system of claim 5, wherein the authentication modules employ one or more services.

7. The system of claim 1, comprising:
a class factory, the class factory selectively instantiates one or more authentication objects based, at least in part, on the first data, and
the class factory makes the one or more instantiated authentication objects callable by the authentication manager.

8. The system of claim 7, comprising:
a data store that holds information associated with selectively instantiating the one or more authentication objects, the data store further holds information associated with making the one or more instantiated authentication objects callable by the authentication manager.

9. The system of claim 8, comprising:
a registrar that registers an authentication object with the class factory.

10. The system of claim 9, wherein the registrar registers an authentication object with the data store.

11. The system of claim 10, wherein the application does not have to be recoded or recompiled to employ the registered authentication object.

12. The system of claim 1, wherein one or more authentication objects generate the third data associated with responding to an authentication challenge associated with at least one of, a Kerberos authentication system, a Digest authentication system, a Basic authentication system, an NTLM authentication system and a certificate based authentication system.

13. The system of claim 1, wherein the authentication manager and the one or more authentication objects are distributed to one or more computers.

14. The system of claim 10, wherein the class factory, the data store and the registrar are distributed to one or more computers.

15. A computer implemented method that utilizes a processor for enabling an application to produce a response to an authentication challenge, comprising:
anticipating an authentication challenge to a resource request from an application based upon run-time machine learning during previous resource requests by applications;
pre-authenticating the resource request by generating and storing an authentication response to the anticipated authentication challenge;
generating a pseudo-challenge not in response to the authentication challenge and storing a response to the pseudo-challenge;
employing a component implemented on a computer readable medium to accept the authentication challenge;
passing a first data associated with the authentication challenge to an authentication manager, where the authentication manager processes the first data into second data of a first type appropriate for a first authentication module, further where the authentication manager processes the first data into second data of a second type appropriate for a second authentication module if the first module is unable to process the authentication challenge, the first and second authentication modules having different requirements for the second data;
passing at least one of the second data associated with the authentication challenge or pseudo-challenge to one or more authentication modules, where the authentication modules are registered with the authentication manager, registering the modules includes informing the authentication manager of which system authentication challenges the module is capable of processing and where the authentication modules are operatively connected to the authentication manager;
producing one or more responses to the authentication challenge and the pseudo challenge; and
using a cache to store one or more third data related to responding to the authentication challenge and the one or more pseudo-challenges.

16. The system of claim 15, comprising:
caching one or more responses to the authentication challenge; and
retrieving a response from the cached responses.

17. The method of claim 15, wherein the authentication challenge is generated by at least one of a Kerberos authentication system, a Digest authentication system, a Basic authentication system, an NTLM authentication system and a certificate based authentication system.

18. The method of claim 15, wherein one or more authentication modules can be created and registered after the receipt of one or more authentication challenges.

19. A computer readable medium, comprising:
computer executable instructions that perform the method of claim 18.

20. A computer implemented method that utilizes a processor for enabling an application to produce a response to an authentication challenge, comprising:
- generating a pre-authentication challenge test message based upon anticipating an authentication challenge to a resource request from an application based upon run-time learning during previous resource requests by applications;
- generating a pseudo-challenge message not in response to the authentication challenge and storing a response to the pseudo-challenge;
- utilizing a component implemented on a computer readable medium to pass a first data associated with the pre-authentication challenge test message to an authentication manager, where the authentication manager processes the first data into second data of a first type appropriate for a first authentication module, further where the authentication manager processes the first data into second data of a second type appropriate for a second authentication module, the first and second authentication modules having different requirements for second data;
- passing at least one of the second data associated with the pre-authentication challenge test message to an appropriate authentication module, if the module is unable to process the challenge passing the at least one of the second data to the at least one different authentication module, where the authentication modules are registered with the authentication manager, and where the authentication modules are operatively connected to the authentication manager;
- producing one or more responses to the pre-authentication challenge test message; and
- caching the one or more responses to the pre-authentication challenge test message and one or more pseudo-challenges.

21. The method of claim 20, wherein the pre-authentication challenge test message is related to an authentication challenge generated by at least one of a Kerberos authentication system, a Digest authentication system, a Basic authentication system, an NTLM authentication system and a certificate based authentication system.

22. The method of claim 20, wherein one or more authentication modules can be created and registered after the generation of one or more pre-authentication challenge test messages.

23. The method of claim 20, wherein the application does not have to be recoded or recompiled to employ the one or more created and registered authentication modules.

24. A computer readable medium having computer executable instructions operable to perform a method comprising:
- generating a pre-authentication challenge test message based upon anticipating an authentication challenge to a resource request from an application based upon run-time learning during previous resource requests by applications;
- generating a pseudo-challenge not in response to the authentication challenge and storing a response to the pseudo-challenge;
- passing a first data associated with the pre-authentication challenge test message to an authentication manager, where the authentication manager processes the first data into second data of a first type appropriate for a first authentication module, further where the authentication manager processes the first data into second data of a second type appropriate for a second authentication module, the first and second authentication modules having different requirements for second data;
- employing a component implemented on a computer readable medium to pass at least one of the second data associated with the pre-authentication challenge test message to an appropriate authentication module, if the module is unable to process the challenge, passing the test message to one or more authentication modules, where the authentication modules are registered with the authentication manager, and where the authentication modules are operatively connected to the authentication manager;
- producing one or more responses to the pre-authentication challenge test message; and
- caching the one or more responses to the pre-authentication challenge test message and the one or more pseudo challenges.

25. A system that utilizes a processor enabling an application to respond to a challenge to a request to access a resource addressable by a URI, comprising:
- means for anticipating an authentication challenge to a resource request from an application based upon run-time learning during previous resource requests by applications;
- means for receiving the challenge, the receiving means separate from the application;
- means for processing data associated with the challenge into second data of a first type appropriate for a first authentication module and second data of a second type appropriate for a second authentication module and distributing at least one of the second data to appropriate producing means, if the first producing means is unable to process the challenge, distributing the at least one of the second data to one or more producing means, the distributing means being separate from the application, the first and second authentication modules having different requirements for second data, the means for processing data generates one or more of its own pseudo challenges not in response to the authentication challenge;
- means for producing a response to the challenge the producing means being separate from the application;
- means for storing a response to the challenge; and
- means for storing one or more third data related to responding to the authentication challenge and the one or more pseudo-challenges.

* * * * *

UNITED STATES PATENT AND TRADEMARK OFFICE
CERTIFICATE OF CORRECTION

PATENT NO.        : 7,322,040 B1
APPLICATION NO.   : 09/818358
DATED             : January 22, 2008
INVENTOR(S)       : Lance E. Olson et al.

Page 1 of 1

It is certified that error appears in the above-identified patent and that said Letters Patent is hereby corrected as shown below:

In column 22, line 48, in Claim 15, delete "pseudo challenge" and insert
-- pseudo-challenge --, therefor.

In column 24, line 25-26, in Claim 24, delete "pseudo challenges" and insert
-- pseudo-challenges --, therefor.

In column 24, line 50, in Claim 25, delete "pseudo challenges" and insert
-- pseudo-challenges --, therefor.

Signed and Sealed this
Twenty-second Day of February, 2011

David J. Kappos
*Director of the United States Patent and Trademark Office*